United States Patent Office 3,219,734
Patented Nov. 23, 1965

3,219,734
METHOD OF MAKING NACREOUS CAST PLASTIC EXHIBITING MULTIPLE COLOR EFFECTS
Harry Edward Mattin, Briarcliff Manor, N.Y., assignor, by mesne assignments, to The Mearl Corporation, Ossining, N.Y., a corporation of New Jersey
No Drawing. Filed June 19, 1961, Ser. No. 117,824
2 Claims. (Cl. 264—73)

This invention relates to cast plastics which are nacreous and, at the same time display multiple color effects.

It is an object of this invention to provide for the preparation of plastic sheets with novel and subtle color effects without the use of conventional dyes or pigments. These colors may be made similar to those of subtly colored jewels, such as the opal.

It is another object of this invention to provide for the preparation of a plastic pearl sheet which simulates in pearlescent effect and color the appearance of mother-of-pearl.

Other objects will become apparent from the following description.

Nacreous pigments which have colors because of light interference phenomena are described in a co-pending patent application, Serial No. 60,793, now U.S. Patent No. 3,123,485, owned by applicant's assignee. It is convenient to speak of these materials as being "optically colored." Such pigments consist of small, plate-like particles whose thickness is of such size that color is produced by light interference phenomena. The thickness which gives rise to a particular color is determined by the index of refraction of the substance. Thus, for basic lead carbonate, which has an index of refraction of 2.09, a yellow-reflecting platelet has a thickness of approximately 105 millimicrons (m$\mu$), a red-reflecting platelet a thickness of approximately 124 m$\mu$, a blue-reflecting platelet a thickness of approximately 138 m$\mu$, and a green-reflecting platelet a thickness of approximately 155 m$\mu$. These values are derived from the known equations which describe light interference effects and which are referred to in the aforesaid co-pending application, Serial No. 60,793, now U.S. Patent No. 3,123,485, wherein it is also pointed out that the multiplaction product of index of refraction and platelet thickness is at least 200 and preferably 200 to 400, where thickness is expressed in millimicrons.

Because these colors arise from light interference rather than from light absorption, as in the case of conventional dyes or pigments, the light which is transmitted through the platelet has the color which is complementary to the reflected light. That is, the yellow-reflecting platelet transmits blue or violet, the red-reflecting platelet transmits green, the blue-reflecting platelet transmits orange or yellow, and the green-reflecting platelet transmits red. It is desirable to use platelets which produce different colors in combination with each other. A layer of green-reflecting platelets under red-reflecting platelets intensifies the green transmission color of the latter. This type of behavior is clearly different from that of conventional dyes, where layers of one on another would serve only to darken and muddy the color.

Furthermore, combinations of platelets with non-complementary colors widen the rainbow-like effect and more closely approach the natural iridescence of mother-of-pearl.

Among the substances which are suitable for the production of interference colors are crystals which are capable of growth in the form of plates with smooth surfaces and uniform thicknesses. Among these are lead hydrogen arsenate, basic lead carbonate, bismuth oxychloride, mercurous formate, zinc phosphate, zinc sulfide, cytosine, and DL-tryptophan. All of these substances can be crystallized as plates which have color when they have the proper thickness. For practical purposes, the platelet should have an index of refraction which differs as much as possible from the substance in which it will be embedded in use, since the intensity of the reflected light is a function of the difference in refractive index between the film or crystal and the surrounding medium. Generally, the plates should have an index of refraction of at least 1.70.

Cast sheets have been made with a number of colors by dispersing each variety of platelet in a viscous syrup, and then juxtaposing the syrups without actually mixing them. This technique is a difficult one as the liquids tend to flow together, causing complementary colors to neutralize to white and others to blend. This technique is used in cell casting, in which a suspension of the platelets in a polymerizable liquid such as polyester resin or partially polymerized acrylic resin is poured into a cell, the cavity of which has the shape of the finished sheet. Most often the cell is made of glass sheets separated by a rubber or plastic gasket which is close to the perimeter of the glass plates. The suspension contains catalyst, and on the heating of the whole assembly, the resin sets to form the cast sheet. Maximum luster and nacreous effect depend on having the individual platelets oriented parallel to the surface of the sheet; this is generally accomplished either by motion during the polymerization reaction or by using so viscous a resin that the orientation imparted to the platelets on flowing into the cell can be retained. The plate-like shape of the particles insures their alignment in any liquid flow which takes place. After the plastic has gelled, the cast sheet can be removed from the cell or mold and subjected to other temperature conditions, if necessary, to cure the material.

Another known method for producing nacreous cast sheets involves centrifugal or rotational casting in which a suspension of the platelets in the polymerizable liquid is poured into a rotating cylinder, and is distributed evenly over the walls of the cylinder by the centrifugal force. The platelets become oriented parallel to the wall of the cylinder. After the plastic has gelled, the cast sheet made by conventional rotational casting is sliced open and laid, while still flexible, on a flat surface. The sheet is then cured until hard, resulting in a cast pearl sheet in which the platelets are uniformly oriented parallel to the surface of the sheet.

Only one color or combination of complementary colors can be attained by this rotational method.

In accordance with the present invention, layers of platelets which have different interference colors, i.e., different "optical colors," are created in a cast plastic by laminating cast sheets containing platelets of different color, or in centrifugal casting by adding a suspension of resin containing platelets of a second color while the surface of the first portion is incompletely cured and still somewhat tacky. A plurality of layers can be added in the same manner. Thus it is possible to create a laminated structure having adjacent layers of various optical colors by the lamination of cast sheets, or by the successive rotational casting of different layers one after the other.

The individual layers can be brought to the surface in the cutting of the laminated cast sheet to make the desired object. For example, if the sheet is cut to make pearl buttons, one method of demonstrating the several colors is to cut a disc from the sheet, and then polish the surface into a concave or convex shape. The several colored layers are revealed by this technique, producing a pattern with concentric colored rings.

Another method of revealing the inner colors is to slice the sheet into sections which are angled with respect to the surface of the sheet. These slightly angled pieces can be used for compact covers, button blanks, cigarette cases, and so on. Combinations of angling and polishing of the surface can produce various patterns, such as stripes, arcs, ellipses, etc.

Using optically colored platelets, there is no danger that the color will be blurred at points of contact where conceivably some intermixing of different colored platelets can take place. The mixing of red and green dyes or conventional pigments would produce brown or black streaks while the mixing of green-reflecting and red-reflecting optically colored platelets produces white. Thus the color combinations remain clean and transparent when using optically colored substance, even if some intermingling should occur at the boundaries. The colors produced in the final product are integral with the plastic and are not provided by a surface film.

The details of the invention become apparent from the following examples, which illustrate the invention in the rotational casting operation.

*Example I*

A 35% suspension of red-reflecting platelets of basic lead carbonate in dibutyl phthalate is dispersed in a polyester casting resin (e.g., "Plaskon" resins, sold by Barrett Division, Allied Chemical & Dye Corp.) so as to produce a final concentration of 0.525% platelets. To the mixture are added catalyst and accelerator, the total then having the following composition, by weight:

| | |
|---|---|
| Red-reflecting platelets (paste containing 35% platelets) percent | 1.5 |
| Polyester casting resin (60 parts "Plaskon 951") (38 parts "Plaskon 9600") percent | 97.8 |
| Methyl ethyl ketone peroxide (60% solution in dimethyl phthalate) percent | 0.6 |
| Cobalt octoate solution containing 6% cobalt percent | 0.1 |
| percent | 100.0 |

The mixture (0.55 lb.) is poured into a cylinder 11.5 inches in diameter and 8.25 inches high, rotating at 150 r.p.m. with its axis horizontal. A layer approximately 50 mils thick is produced. At approximately 20 minutes the resin has set but still has a tacky surface; at this point a second layer is introduced, consisting of the same resin-catalyst-accelerator composition as shown above, but containing enough 35% green-reflecting platelet suspension to give an actual platelet content of 0.7%. After approximately 20 minutes more, a 0.7% suspension of blue-reflecting platelets is similarly added.

The three-layer cast sheet is removed from the centrifuge after an additional 30 minutes by cutting the still flexible sheet in a direction parallel to the cylinder axis. The sheet is allowed to fall flat on a plane surface, yielding a rectangle consisting of three layers laminated together. The cast sheet is cured by heating at approximately 90° C. for approximately 20 minutes.

Mother-of-pearl-like buttons are prepared from the sheet by cutting discs which are then polished to have a convex surface.

*Example II*

Yellow-reflecting platelets (0.5%) of basic lead carbonate are incorporated in a syrup of partially polymerized methyl methacrylate monomer (viscosity 25,000 cps. at 25° C.). Catalyst consisting of 1% of a 25% acetyl peroxide solution in dimethyl phthalate is added, and the mixture is poured into a cylinder rotating at 60 r.p.m. and heated to 60° C. by infrared lamps. After three hours, a similar suspension containing 1.0% blue-reflecting platelets is added. The flexible sheet is withdrawn after an additional three hours, after which it is cured as in Example I. Objects made from this sheet are blue and yellow, the pattern depending on the method of cutting.

The colors and color intensities in the previous examples can be varied by backing the colors with a black, gray, or white layer. This can be done either by adding an additional layer to a stack of optically colored cast sheets. Another alternative is to paint the back of the finished laminated sheet with a suitable black, gray, or white coating. A black backing produces more dramatic color effects, whereas the white or light colored backing yields subtle color effects similar to that of most varieties of mother-of-pearl and jewels like the opal.

It is apparent that innumerable combinations of color can be achieved by means of the procedure herein described. In every case there is the inherent advantage in the method that blending of colors where they happen to merge produces a light color or whiteness instead of the darkness which occurs when conventional coloring substances blend, and that adjacent layers enhance one another's color instead of producing progressive darkening.

It should be understood that the plastic laminate herein contemplated may include any pigment which derives its color from an interference effect regardless of the specific dimensions of the pigment particles, whether crystalline or amorphous. Typical cast plastics would include not only the polyesters, but also epoxies, acrylics such as polymethyl methacrylate, polystyrene, phenol formaldehyde, and melamine and urea formaldehydes. It will be apparent to those skilled in the art that other light-transmitting cast plastics can also be used, so long as the index of refraction is in the preferred range of about 1.4 to 1.65.

Although this invention has been described with respect to a few embodiments, it should be understood that many variations and modifications will now be obvious to those skilled in the art, and it is preferred, therefore, that the scope of this invention be limited not by the specific disclosure herein, but only by the appended claims.

What is claimed is:

1. The method of making a nacreous cast plastic exhibiting multiple colors integral with said plastic, comprising the steps of pouring a suspension of a light-transmitting plastic containing an optically colored nacreous pigment into a rotating cylinder to distribute said suspension over the walls of the cylinder by centrifugal force and thereby rotationally cast a first plastic layer having said nacreous pigment oriented parallel to the walls of the cylinder, partially curing said first layer, and pouring a second suspension of a light-transmitting plastic containing a nacreous pigment having a range of thicknesses different from the range of thicknesses of the first mentioned nacreous pigment and thus having a different optical color into said rotating cylinder to distribute the same evenly over the surface of said first layer and thereby produce a second plastic layer having the last mentioned nacreous pigment distributed therethrough oriented parallel to the walls of said cylinder, whereby to produce a composite plastic layer exhibiting multiple color effects.

2. The method as defined in claim 1, including repeating said pouring and partial curing steps in sequence to produce a plurality of optically colored plastic layers at least the adjacent members of which possess different optical interference colors, removing the cylindrical composite layer formed by rotational casting from said cylinder, slicing said cylindrical composite layer open to produce a composite sheet exhibiting multiple color effects, and cutting the composite sheet to produce a plurality of plastic articles therefrom.

References Cited by the Examiner
UNITED STATES PATENTS

| | | | |
|---|---|---|---|
| 2,071,907 | 2/1937 | Tattersall | 18—58 |
| 2,078,007 | 4/1937 | Lurie | 117—159 |
| 2,265,226 | 12/1941 | Clewell et al. | 18—58.3 |
| 2,550,938 | 5/1951 | Raber | 264—311 |
| 2,624,238 | 1/1953 | Widdop et al. | 88—105 |
| 2,668,328 | 2/1954 | Porter | 18—58 |
| 2,875,076 | 2/1959 | Suchow | 106—148 |
| 2,945,770 | 7/1960 | Suchow | 106—148 |
| 3,010,158 | 11/1961 | Broderson | 18—58 |
| 3,113,829 | 12/1963 | Porter | 264—108 |
| 3,123,485 | 3/1963 | Miller et al. | 106—148 |
| 3,123,490 | 3/1964 | Bolomey et al. | 106—291 |

ALEXANDER WYMAN, *Primary Examiner.*

EARL M. BERGERT, HAROLD ANSHER,
*Examiners.*